UNITED STATES PATENT OFFICE.

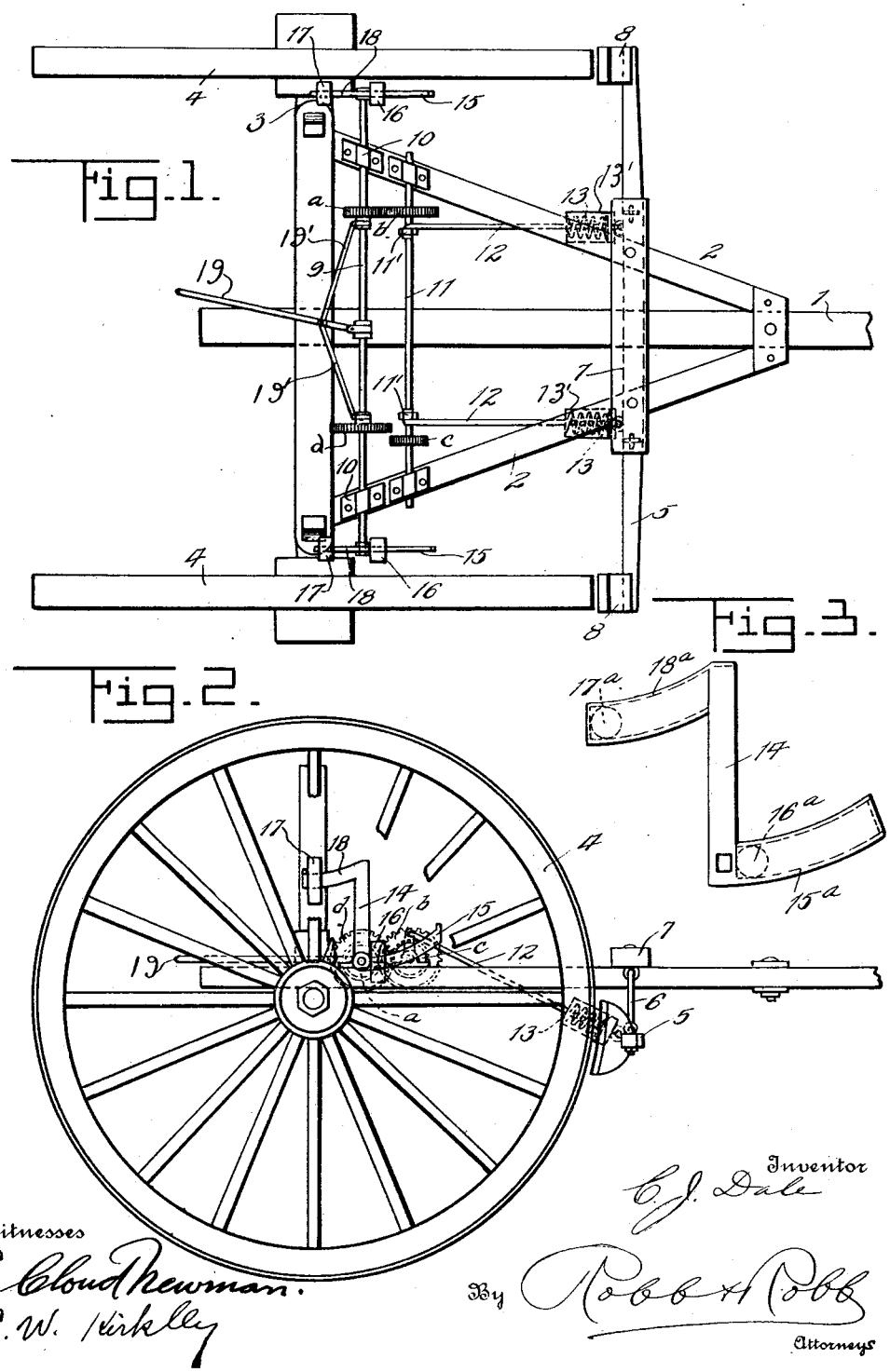

CHARLES JACKSON DALE, OF TOMS CREEK, VIRGINIA.

VEHICLE-BRAKE.

1,110,255.  Specification of Letters Patent.  Patented Sept. 8, 1914.

Application filed December 17, 1913. Serial No. 807,255.

*To all whom it may concern:*

Be it known that I, CHARLES JACKSON DALE, a citizen of the United States, residing at Toms Creek, in the county of Wise and State of Virginia, have invented certain new and useful Improvements in Vehicle-Brakes, of which the following is a specification.

The primary object of the present invention is to provide a braking device for vehicles which is automatic in its operation to impede the movement of the same in descending grades, braking stress imparted to said vehicle being in proportion to the pitch of the grade.

A further object in view is the provision of means for setting the braking device, whereby to increase braking power applicable to the vehicle according to the load carried thereby.

More specifically speaking, it is contemplated to provide actuating mechanism connected to the brake beam or shoe of a wagon, involving a peculiar operating member normally inactive until the vehicle descends the grade, whereupon said member is acted upon by gravity and through the instrumentality of gears braking action is imparted to the brake member aforesaid.

With the above and other objects in view, this invention consists in the construction, combination and arrangement of parts all as hereinafter more fully described, claimed and illustrated in the accompanying drawing, wherein:

Figure 1 is a fragmentary view of the running gear of a vehicle such as a wagon, showing my braking mechanism attached thereto. Fig. 2 is a side elevation of the same, parts being broken away to show more clearly the details of construction. Fig. 3 is a detail, enlarged view of a modified form of operating member for my braking device.

Throughout the following detail description, and on the several figures of the drawing, similar parts are referred to by like reference characters.

Referring to the drawing, and specifically describing my invention, the numeral 1 indicates the perch or coupling pole, 2 the hind-hounds, 3 the rear axle and 4 the wheels of a wagon to which the braking mechanism is attached. This braking mechanism comprises a brake beam 5 suspended by means of the link members 6 from the supporting bar 7 disposed on the hind-hounds 2, said beam 5 extending transversely of the vehicle as is usual and having secured to its extremities the usual brake shoes 8. Near the rear axle and extending parallel thereto is disposed an operating shaft 9 having its bearings 10 on the hounds 2 and adjacent this operating shaft is a second shaft 11 similarly mounted upon the hounds, said last-mentioned shaft being connected to the brake beam 5 by the connecting rods 12, one end of each of which engages in a vertical arm 11' on the second shaft, while the other end is connected to a spring 13. As shown in Fig. 1 of the drawings each connecting rod 12 is provided with the spring 13 about one end and each of which springs is compressed in its surrounding casing 13' when imparting motion to the brake beam 5, these connecting members between the shaft 11 and the beam 5 being in spaced relation so as to properly impart relative movement to the ends of the brake beam for braking the action of the vehicle as will be hereinafter more fully set forth.

Upon the operating shaft 9 adjacent one end is located a spur gear $a$ capable of meshing with a larger spur gear $b$ carried by the shaft 11, and near the opposite ends of the shafts 9 and 11 are located the spur gear $c$ and the larger spur gear $d$ adapted to coöperate therewith to impart differential movement to the braking device in its actual operation. Secured to each extremity of the operating shaft 9 so as to extend vertically therefrom is the operating means consisting of a lever 14, which lever has extending forwardly of the vehicle from its lower end an upwardly curved arm 15 upon which arm is slidably mounted a gravity actuating member or weight 16. Each lever is maintained in the vertical position shown in the drawings under normal conditions by the tendency of weight 16 to assume a position on the arm 15 directly adjacent the base of the lever 14 and its normal position mentioned is maintained by the counterbalanced weight 17 slidably mounted upon the arm 18 extending rearwardly from the topmost portion of the lever 14, it being noted that the arm 18 inclines downwardly and thereby tending to cause the weight 17 to remain at the outer free end thereof.

The gear members $a$ and $d$ on operating shaft 9 carrying the operating means at its extremities are adapted to be shifted laterally to cause engagement and disengagement with differential gears $c$ and $b$, and any preferred means may be employed for causing shifting of said first mentioned gear members such as the provision of a lever 19 having its extremity connected to the shaft 9 at any suitable point in the length of the same which lever through links 19' is capable of moving one of the gear members $a$ and $d$ into mesh and the other out of mesh with the coöperating gear elements $c$ and $d$ according to which direction the lever is shifted.

Describing the use and operation of my invention as hereinbefore set forth, it is to be understood that the braking device is set for operation according to the load on said vehicle prior to using the same. That is to say, assuming that the vehicle is loaded the driver of the vehicle shifts, by moving the lever 19 laterally, the small pinion $a$ into mesh with the large pinion $b$. Upon the arrival of the vehicle at a descending grade immediately the vehicle has assumed an inclined position, the weight 16 on the arm 15, under the action of gravity, starts to move outwardly along said arm and simultaneously weight 17 moves inwardly on the arm 18. The stable equilibrium of each of the levers 14 is thus overbalanced or made unstable. The shaft 9 is caused to rotate through the instrumentality of these levers, said rotation through the gears $a$ and $b$ causing a draft on the connecting rods 12, immediately bringing the brake shoes 8 into contact with the wheels 4 of the vehicle. By reason of the ratio of the gears $a$ and $b$ sufficient braking stress is afforded by the shoes to insure gradual descent of the vehicle down the grade. The greater the inclination of said grade the farther the weight 16 will move out on the arm 15 and consequently the greater the braking stress applied. As soon as the vehicle has descended the grade the levers will assume their normal stable position, releasing the brake.

When the wagon is to be used in light condition or unloaded, the driver shifts the lever 19 in the direction opposite that hereinbefore mentioned bringing the gears $a$ and $b$ out of mesh and the gears $c$ and $d$ into mesh. Braking operation is then accomplished in the same manner when descending a grade as that described hereinbefore during the coöperation of the gears $a$ and $b$, excepting that the power due to the ratio of the gears $d$ and $c$ is considerably less. The interposition of the springs 13 between the connecting rods 12 and the brake beam 5 insures a resilient braking action and prevents likelihood of breakage of the parts in the use of the device.

It is comprehended that the levers 14 and their weights may be of considerable size and proportion according to the vehicle upon which they are applied and various changes may be made in the details of structure without departing from the spirit of my invention, and within the scope of the claims hereto appended. It is noted that instead of using the full spur gears $b$ and $d$ geared segments may be employed as will be understood by those skilled in the art to which this invention refers.

In Fig. 3 I have shown a slightly modified form of operating lever 14 in which the lower upwardly inclined arm $15^a$ is flanged to hold a roller or ball $16^a$ capable of rolling along the arm to perform the function ascribed to the slidable weight 16 and in like manner the upper rearwardly extending arm $18^a$ may be flanged and coöperating therewith a roller or ball weight $17^a$ may be employed.

Having thus described my invention, what I claim as new is:

1. Braking mechanism for a vehicle comprising a brake member, an operating lever for said member normally inactive when in stable equilibrium and operable to apply the brake member when its center of gravity is shifted, and a gravity actuating member carried by said lever and movable to unbalance the lever upon movement of the vehicle down grade.

2. Braking mechanism for a vehicle comprising a brake member, an operating lever operatively connected with said brake member and having an upright portion and an arm extending at an angle from one side of the same, and means adapted to travel on said arm away from the upright portion for actuating the lever upon movement of the vehicle down grade, the lever having another arm extending angularly from its other side, and counterbalance means on the latter arm for maintaining the lever normal and movable in a direction with respect to the upright portion aforesaid opposite to the means on the first mentioned arms in actuating the lever.

3. Braking mechanism for a vehicle comprising a brake member, an operating lever operatively connected with said brake member and having an arm extending therefrom, means adapted to travel on said arm in one direction whereby to overbalance and thereby actuate the lever upon movement of the vehicle down grade, said means being movable in the opposite direction when the vehicle again reaches level, and means carried by the lever for automatically normalizing the same on movement of the actuating means in the last mentioned direction and adapted to maintain the lever in normally inactive position.

4. Braking mechanism for a vehicle comprising a braking member disposed contiguous to the vehicle wheels, an operating lever operatively connected with said braking member and having an arm extending longitudinally of the vehicle, a weight member movable along said arm to actuate the lever upon movement of the vehicle down grade, said lever having a second arm extending in the opposite direction to the first-mentioned arm, and counterbalanced means disposed on the second-mentioned arm adapted to coöperate with the weight member aforesaid to maintain the lever in normal inactive position.

5. Braking mechanism for a vehicle comprising a brake member, operating means for said brake member comprising a lever, means for automatically actuating said lever proportionate to the degree of declivity on movement of the vehicle down grade, a transverse shaft movable longitudinally, means intermediate the shaft and the brake member for controlling the extent of actuation of said brake member, and means for moving the shaft to vary its relation with respect to the controlling means according to the load carried by said vehicle.

6. Braking mechanism for a vehicle comprising a brake member, operating means for said brake member comprising a lever, means for automatically actuating the operating means, a shaft to which said lever is connected for rotation by said lever, a second shaft adjacent the first-mentioned shaft, gearing on said shafts, and a connecting member connecting the second shaft with the brake member whereby upon rotation of the first-mentioned shaft by the lever to actuate the brake member.

7. Braking mechanism for a vehicle comprising a brake shoe, an operating shaft operatively connected to said brake shoe for imparting braking action thereto, variable gearing on said shaft, a shifting lever coöperating with the shaft and operatively connected with the gearing for changing intermeshing relation of the same whereby to predeterminately set the gearing to vary the extent of braking stress imparted to the brake shoe according to the load of the vehicle, and means for actuating the operating shaft aforesaid in its set positions.

8. Braking mechanism for vehicles comprising a brake beam, brake shoes carried thereby, means for actuating said brake beam comprising an operating lever having an arm extending therefrom and inclining upwardly, a weight member movable on said arm to actuate said lever, the lever having a second arm extending oppositely to the arm aforesaid, a counterbalance weight movable on the second-mentioned arm for coöperation with the actuating weight aforesaid, an operating shaft for said lever, a second shaft adjacent the operating shaft, differential gearing carried by said shafts, means for shifting the gearing on the operating shaft to engage and disengage the gearing aforesaid, and connecting rods connected with the second-mentioned shaft and the brake beam.

In testimony whereof I affix my signature in presence of two witnesses.

CHARLES JACKSON DALE.

Witnesses:
S. H. PAPE,
CHAS. COUCH.

---

Copies of this patent may be obtained for five cents each, by addressing the "Commissioner of Patents, Washington, D. C."